(12) United States Patent
Elbing et al.

(10) Patent No.: US 9,152,230 B1
(45) Date of Patent: *Oct. 6, 2015

(54) TACTILE USER INTERFACE DEVICE

(76) Inventors: Kristofer E. Elbing, Wayland, MA (US); Jonathan T. Foote, Menlo Park, CA (US)

(*) Notice: Subject to any disclaimer, the term of this patent is extended or adjusted under 35 U.S.C. 154(b) by 776 days.

This patent is subject to a terminal disclaimer.

(21) Appl. No.: 12/072,502

(22) Filed: Feb. 26, 2008

Related U.S. Application Data

(63) Continuation of application No. 09/835,946, filed on Apr. 16, 2001, now Pat. No. 7,337,400, which is a continuation of application No. 09/028,069, filed on Feb. 23, 1998, now Pat. No. 6,219,034.

(51) Int. Cl.
  *G06F 3/0488* (2013.01)
  *G06F 3/01* (2006.01)

(52) U.S. Cl.
  CPC .............. *G06F 3/016* (2013.01); *G06F 3/0488* (2013.01)

(58) Field of Classification Search
  CPC ... G06F 3/016; G06F 2203/014; G06F 3/011; G06F 3/03543; G06F 3/0488; G06F 3/04886; G06F 3/04883; G06F 3/0481
  USPC ......... 715/702, 864, 744–746, 701, 703, 704, 715/708
  See application file for complete search history.

(56) References Cited

U.S. PATENT DOCUMENTS

| | | | |
|---|---|---|---|
| 5,714,978 A * | 2/1998 | Yamanaka et al. | 345/157 |
| 5,880,714 A * | 3/1999 | Rosenberg et al. | 345/156 |
| 5,973,689 A * | 10/1999 | Gallery | 715/859 |
| 6,046,726 A * | 4/2000 | Keyson | 345/156 |
| 6,084,587 A * | 7/2000 | Tarr et al. | 345/419 |
| 6,131,097 A * | 10/2000 | Peurach et al. | 1/1 |
| 6,195,592 B1 * | 2/2001 | Schuler et al. | 700/83 |
| 6,219,032 B1 * | 4/2001 | Rosenberg et al. | 345/157 |
| 6,219,034 B1 * | 4/2001 | Elbing et al. | 345/158 |
| 6,243,075 B1 * | 6/2001 | Fishkin et al. | 345/156 |
| 6,262,712 B1 * | 7/2001 | Osborne et al. | 345/156 |
| 6,271,834 B1 * | 8/2001 | May et al. | 345/168 |
| 6,300,936 B1 * | 10/2001 | Braun et al. | 345/156 |
| 6,340,957 B1 * | 1/2002 | Adler et al. | 345/1.3 |
| 6,422,941 B1 * | 7/2002 | Thorner et al. | 463/30 |
| 6,630,941 B1 * | 10/2003 | Addison | 715/702 |
| 7,337,400 B1 * | 2/2008 | Elbing et al. | 715/702 |
| 2002/0057294 A1 * | 5/2002 | Ejima et al. | 345/792 |
| 2002/0057351 A1 * | 5/2002 | Suzuki et al. | 348/232 |

* cited by examiner

*Primary Examiner* — Steven Sax

(57) ABSTRACT

A computer system includes a computer processor, an operating system operative in connection with the computer processor, and a display responsive to the operating system. The system also has a pointing device that includes a position sensor and a tactile actuator. A pointing device driver is responsive to the position sensor, and the tactile actuator is responsive to the pointing device driver. A general-purpose application is responsive to the pointing device driver and to the operating system and in communication with the display, and the pointing device driver is also responsive to the general purpose application. The system further includes a profile that maps region changes associated with material displayed on the screen to tactile signals to be sent to the tactile actuator.

21 Claims, 8 Drawing Sheets

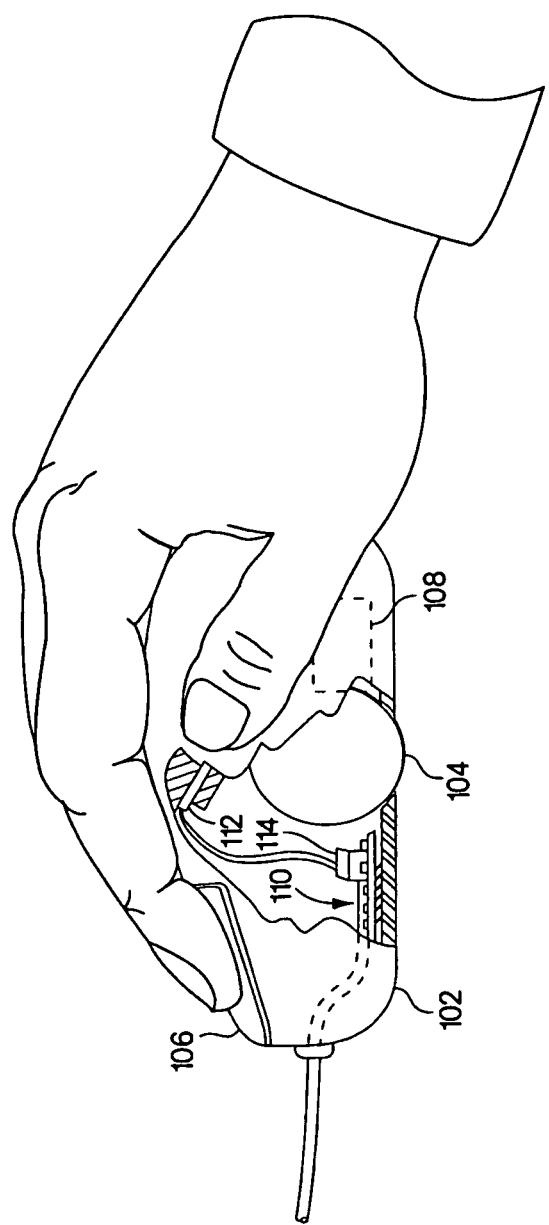

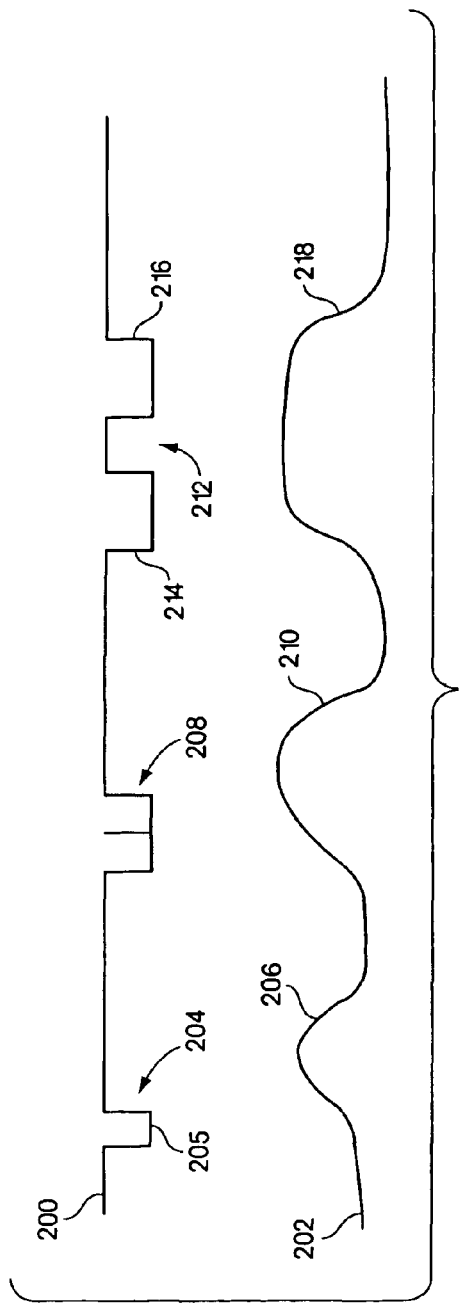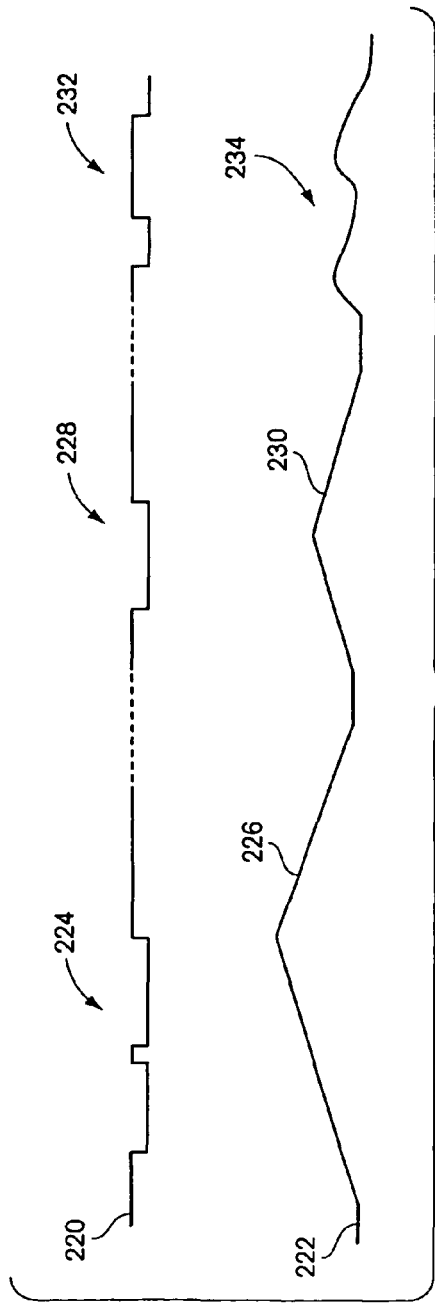

TACTILE USER INTERFACE DEVICE

This application is a continuation of Ser. No. 09/835,946, filed Apr. 16, 2001, now U.S. Pat. No. 7,337,400, which is a continuation of Ser. No. 09/028,069, filed Feb. 23, 1998, now U.S. Pat. No. 6,219,034, which are both herein incorporated by reference.

FIELD OF THE INVENTION

This invention relates to computer interfaces that employ tactile feedback.

BACKGROUND OF THE INVENTION

General-purpose pointing devices, such as the well-known mouse, have been widely adopted as a supplement to keyboards in the user interfaces of computers. One type of prior art mouse has been equipped with a tactile feedback area to provide a virtual graphic display to blind users. Another features an actuator that provides a variable resistance to motion of the mouse. More complex and expensive systems that employ multi-dimensional or proportional feedback have also been proposed. None of the prior art approaches, however, has been widely adopted to provide an optimum general-purpose pointing device with tactile feedback for use with graphical user interfaces.

SUMMARY OF THE INVENTION

In one general aspect, the invention features a computer system that includes a computer processor, an operating system operative in connection with the computer processor, and a display responsive to the operating system. The system also has a pointing device that includes a position sensor and a tactile actuator. A pointing device driver is responsive to the position sensor, and the tactile actuator is responsive to the pointing device driver. A general-purpose application is responsive to the pointing device driver and to the operating system and in communication with the display, and the pointing device driver is also responsive to the general purpose application. The system further includes a profile that maps region changes associated with material displayed on the screen to tactile signals to be sent to the tactile actuator.

The system can be operative to detect movement from one group of regions to another and change profiles based on the detected movement. The system can be operative to send a boundary actuation command to the tactile actuator upon detecting the movement from one group of regions to another. The groups of regions can correspond to different display windows. The system can be operative to automatically determine a range of region attributes and normalize the intensity of the tactile signals based on this determination. The system can be operative to detect a guard band surrounding transitions between regions in the map. The system can be operative to detect a speed of motion from the position sensor and provide tactile signals to the tactile actuator in anticipation of changes in the regions when the speed exceeds a certain value. The system can be operative to detect a speed of motion from the position sensor and simplify tactile signals to the tactile actuator when the speed meets certain criteria. The system can be operative to detect a speed of motion from the position sensor and eliminate tactile signals to the tactile actuator when the speed meets certain criteria. The profile can include a storage element that specifies whether heuristics are to be applied to determine a relationship between region changes and tactile signals. The system can be operative to change display attributes of a cursor displayed on the screen when the position sensor indicates a change in position. The pointing device can further include a tactility control and the system can be operative to send different tactile signals to the actuator in response to user actuation of the control. The system can include a housing and the tactile actuator can be a pressure-wave generating tactile actuator mounted inside a portion of the pointing device housing. The pointing device can be a mouse, and the transducer can be mounted inside the housing of the mouse. The system can be operative to send finite duration pulses to the actuator that are no longer than ten cycles long for an individual change in regions. The position sensor can be in a mouse and the actuator can be in a mouse pad. The actuator and the position sensor can be in a touch pad. The profile can map regions that match display regions displayed on the display. The profile can map regions that correspond to absolute display intensity of the display regions. The profile can map regions that are arranged in a regularly spaced Cartesian grid. The profile can map at least some of the regions to correspond to cells each containing a single alphanumeric character. The system can be operative to translate a difference in a property value of two of the regions into an intensity of a tactile signal. The system can further include an audio device and be operative to provide an audio signal to the audio device, and information transmitted by the audio signal can correspond to information transmitted by the tactile signal.

In another general aspect, the invention features a method of operating a computer that includes maintaining a map of regions corresponding to regions displayed on a display screen, responding to signals from a pointing device to define a cursor position relative to the regions expressed in the map, displaying a cursor in a first of the regions displayed on the display screen, detecting a signal from a pointing device that indicates user actuation of the pointing device corresponding to a movement of the cursor from a first of the regions expressed in the map to a second of the regions expressed in the map, sending an actuation command request signal to an actuator in the pointing device in response to the detection of user actuation in the step of detecting, and generating a tactile signal in the pointing device in response to the actuation command. The steps of detecting, sending, and generating can cooperate to provide actuation request signals substantially only during displacement of the pointing device, delayed by processing overhead.

In a further general aspect, the invention features a memory for use with a computer system with a tactile user interface device, including a boundary descriptor operative to instruct the system whether a boundary between portions of a display layout is to be associated with tactile attributes to be presented to the user, a heuristic flag operative to instruct the system whether to use heuristics to determine how to associate the display layout with tactile attributes, and at least one further mapping element that includes a predefined relationship between the display layout and tactile attributes. The further mapping element can be a preferred element, and the memory can include an additional further mapping element, the additional further element being a default element.

In another general aspect, the invention features a pointing device that includes a position sensor, a serial channel operatively connected to an output of the position sensor, a linear circuit having an input connected to the serial channel, and a tactile actuator having an input connected to the linear circuit. The linear circuit can be an active circuit having a power supply input responsive to the serial channel, or it can be a passive circuit.

The invention is advantageous in that it can provide a user with meaningful tactile feedback from a general-purpose computer with a simple and inexpensive tactile pointing device. By sending change-of region signals to a pointing device, embodiments of the invention provide information to the user when he or she needs it most—when the pointing device is being manipulated. Systems according to the invention can also be advantageous in that they permit multiple modes of interacting with the computer, depending both on whether a system can identify an application the user is interacting with and the type of that application.

Tactile sensation according to the invention can benefit a computer user by supplementing visual navigation. This additional information may increase productivity, reduce errors, or both. These enhancements can be particularly important in detailed authoring tasks, or where there is a large amount of confusing information on the screen, such as in the case of a multi-tasking operating system with several windows open.

BRIEF DESCRIPTION OF THE DRAWINGS

FIG. 7 is a drawing of a mouse for use as a pointing device in the system of FIG. 1 with a cut-away portion showing its internal construction;

FIG. 9 is a character-mode timing diagram for the circuit of FIG. 8A or 8B;

FIG. 10 is a burst mode timing diagram for the circuit of FIG. 8A or 8B; and

DETAILED DESCRIPTION OF AN ILLUSTRATIVE EMBODIMENT

Figure 1:
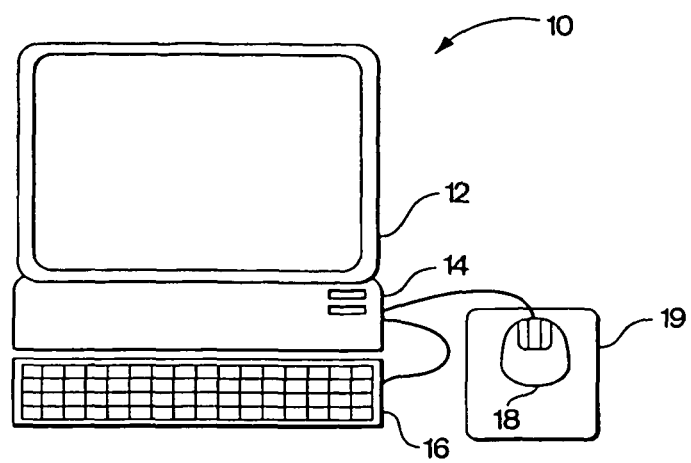
FIG. 1 is diagram illustrating a computer system incorporating tactile feedback elements according to the invention.
Figure 2:
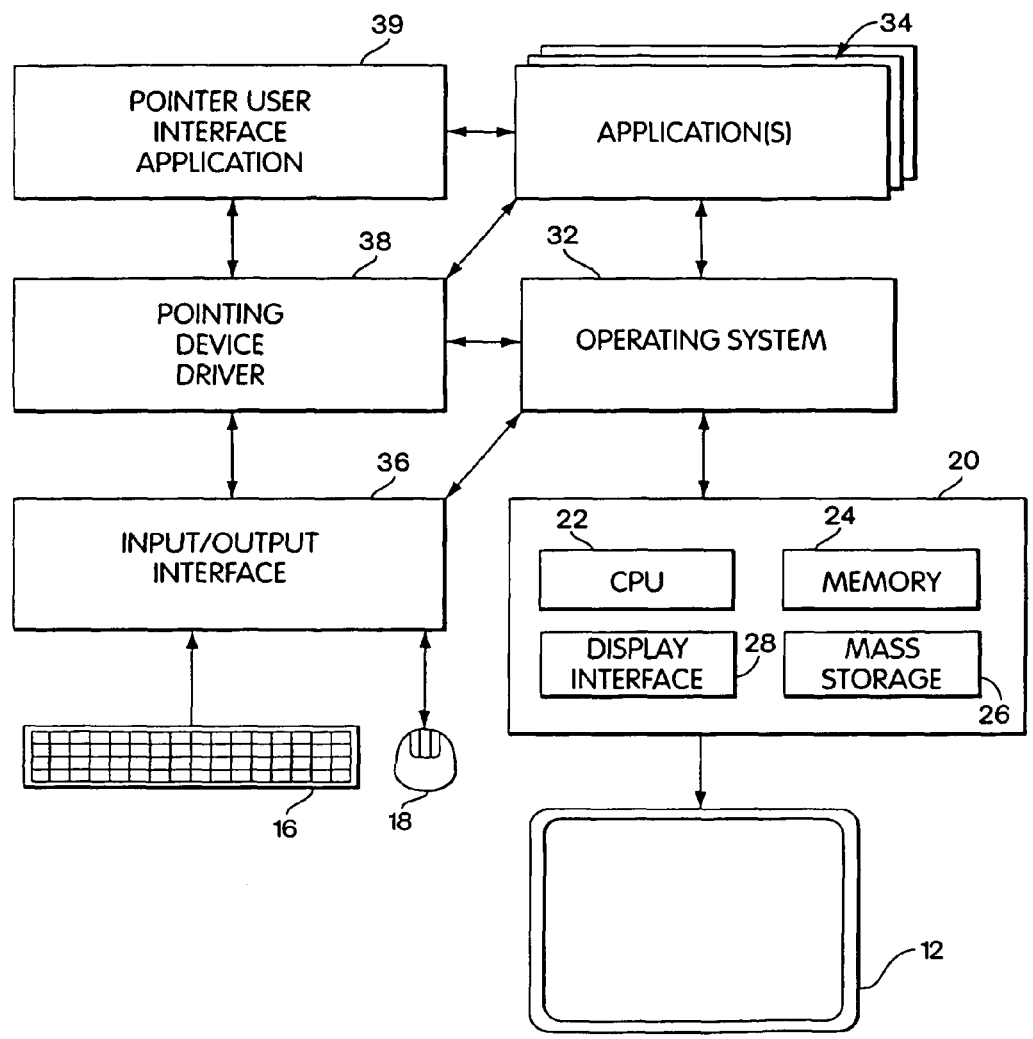
FIG. 2 is a block diagram of principal components of the system of FIG. 1.

Referring to FIGS. 1 and 2, an illustrative computer system 10 according to one general aspect of the invention includes a display 12, a processing system 14, a keyboard 16, and an interactive pointing device 18, which can be a mouse. The processing system includes processing circuitry 20 that comprises computing circuitry components such as a central processing unit 22, memory storage 24, mass storage 28 (e.g., disk storage), and display interface circuitry 28 to provide display signals to the display. The display interface circuitry can take the form of a special-purpose display processor.

Also included in the processing system 14 is an operating system 32 that interacts with the processing circuitry 20. The operating system provides system support functions that enhance the capabilities of the processing circuitry, such as a file system, task management, and drivers. The operating system can also provide menu support and windowing capabilities.

An input/output interface 36 also forms a part of the processing system. The input/output interface is operatively connected to the processing circuitry 20 and includes one or more input lines and output lines that can be connected to peripheral devices. The input/output interface also generally includes hardware that allows low-level routines in the operating system to interact with peripheral devices. The input/output interface can provide functional groupings of signal lines, such as connectors designed to interface with standard parallel, serial, or telephonic formats.

The user can also install application programs 34 on the processing system 14. These can interact with the operating system to use the computing circuitry. In some instances the application programs may bypass the operating system to interface more directly with the computing circuitry.

Figure 6:
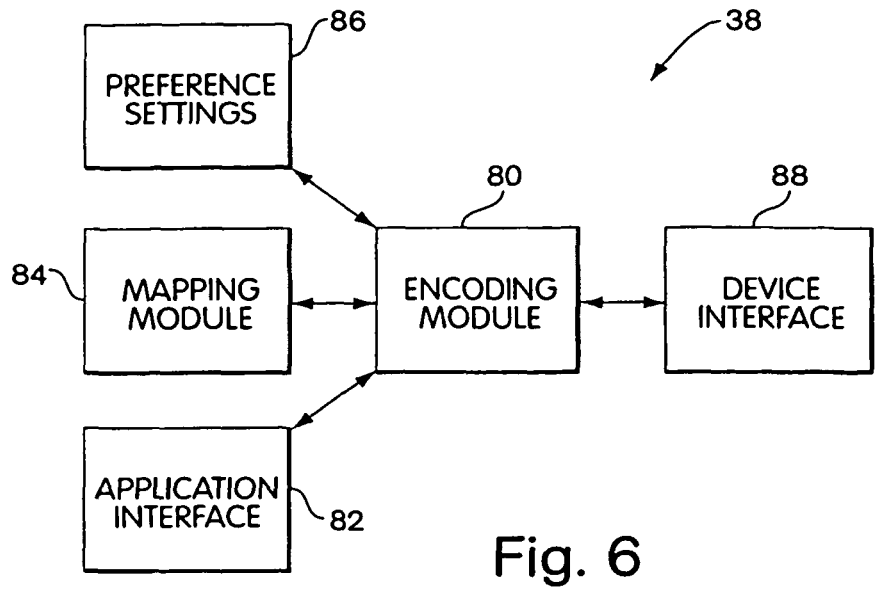
FIG. 6 is a block diagram of a pointing device driver for the system of FIG. 1.

Referring to FIGS. 1, 2, and 6, the processing system 14 further includes a pointing device driver 38 that provides pointing device support to the application programs 34 and/or operating system 32 for the input/output interface 36 when it is connected to the interactive mouse 18. The pointing device driver can interact with the input/output interface directly, or via the operating system.

The pointing device driver 38 includes an encoding module 80 that interacts with an application interface 82, a mapping module 84, a preferences storage area 86, and a device interface 88. The application interface interacts with the operating system 32 and applications 34 to communicate display data or other tactile information with them. The mapping module defines mapping strategies for the different applications based on user input and the types of applications provided. The device interface interacts with the computer's input/output interface 36. The encoding module generally receives inputs from these sources and generates a signal that drives the actuator in the pointing device.

Figure 4:
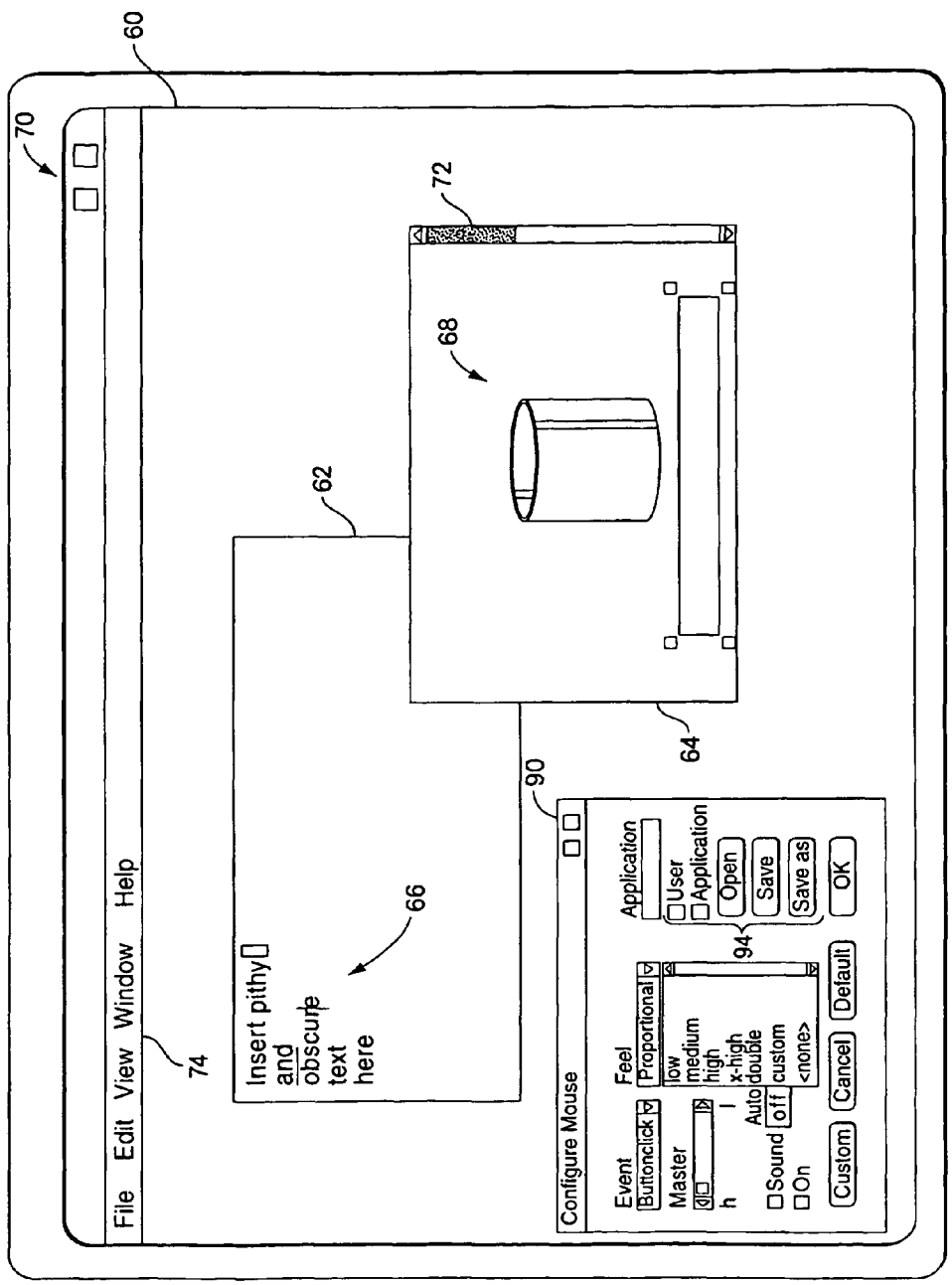
FIG. 4 is an example display for the system of FIG. 1.

Referring to FIGS. 1, 2, and 4, a pointer user interface application 39 can also be provided with the processing system 14. This application includes a user interface module, an application preference interface, and a preferences storage area. The user interface module presents a configuration window 90 that includes event association controls 92 that allow the user to associate region change events with types of tactile commands. These associations can be system-wide, or they can be application-specific. Classes of applications are also supported, so that, for example, all text-based windows and all graphics-based windows can behave in the same way. Operating system user interface elements, such as buttons and sliders can also be associated with types of tactile commands in similar ways.

The configuration window 90 also includes file save controls 94 that allow a user to save or retrieve user profiles of control settings. These controls can also be used to retrieve or save application profiles, which define the correspondence between screen events and tactile commands for individual applications. These profiles can be supplied with the applications themselves or defined by the user. The user thus has control over the feel of the interface, although he or she may choose to simply rely on the defaults specified by the application suppliers.

The user can also override the application profiles by specifying a native mode. In native mode, mapping is derived by the device driver as the computer operates. It defines mappings based on the content of the screen. For example, if the driver detects text in a window, it will use a textual mode, and if it detects graphics, it will use a graphical mode.

Each tactile signal sent to the user can take the form of a finite-duration tactile impulse, such as a single electrical pulse, or a very short pulse train (i.e., around ten cycles or less). The user need not receive any steady state tactile information from the pointing device, and such information may even be distracting or confusing. This encoding method nonetheless provides significant additional information over that provided on the screen at a low cost with low power consumption. An example of a tactile mapping strategy is shown in Table 1. The mapping strategy for each group of regions can also be tailored by the user through the configuration window to fit his or her preferences, or to accommodate custom applications.

| Type of event | Type of command signal |
|---|---|
| Graphical pixel-to-pixel | Intensity-change-based pulse intensity |
| Graphical grid crossing | Medium intensity pulse |
| Graphical pixel-to-pixel in zoom mode | Medium intensity pulse |
| Textual character-to-character | Low intensity pulse |
| Textual normal character-to-attribute | Medium intensity pulse |
| Textual character-to-character drag (select) | High intensity pulse |
| Window boundary event | High intensity double pulse |
| Menu on | Medium intensity pulse |
| Menu-to-submenu | Low intensity pulse |
| Button click | Extra-high intensity pulse |
| Area change | No pulse |
| Button boundary event | Medium intensity pulse |

Figure 5:
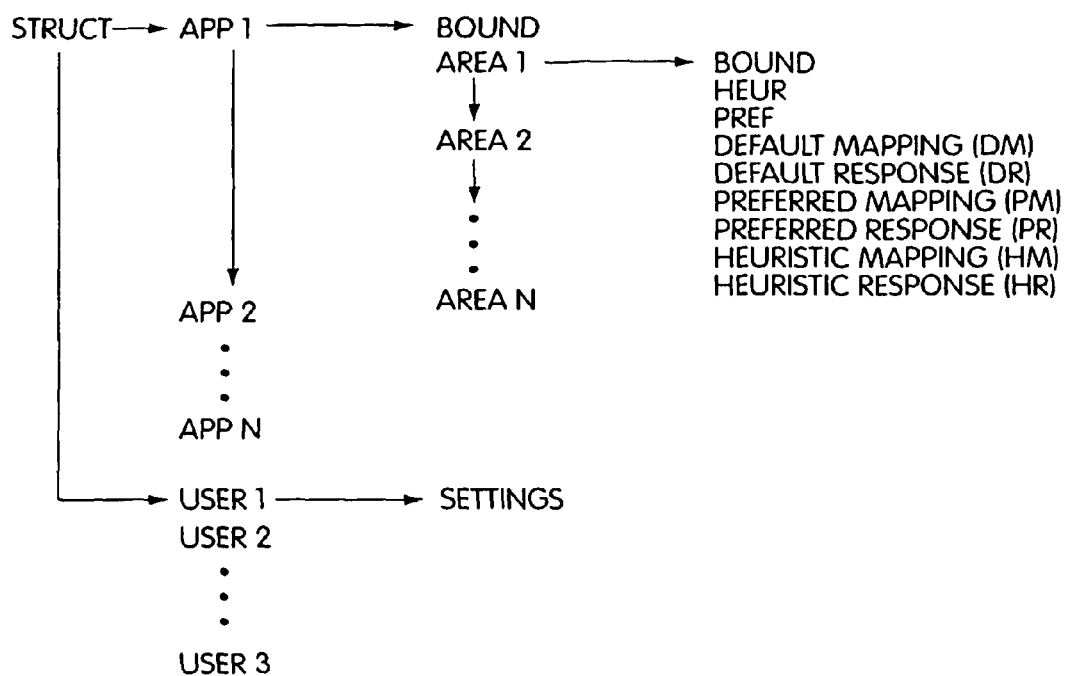
FIG. 5 is a preferences data structure for the system of FIG. 1.

Referring to FIG. 5, a preferences data structure STRUCT includes a linked list of application field identifiers APP1, APP2, . . . APPN. Each field identifier is associated with a boundary field BOUND and a linked list of area fields AREA1, AREA2, . . . AREAN. The boundary field specifies a command to be sent to the actuator upon entering the application, if any. The area fields define different areas in an application. These can be specified by a screen area for a particular mode. The areas can be detected from explicit cues from the operating system or application, or by evaluating visual attributes of the areas, such as by evaluating representative pixel checksums.

Each area field includes a boundary field BOUND, a heuristic flag HEUR, a preference flag PREF, a default mapping field DM, a default response field, DR, a preferred mapping field PM, a preferred response field, a heuristic mapping field HM, and a heuristic response field HR. The boundary field specifies a command to be sent to the actuator upon entering the area. The default mapping field specifies the type of region-shift that is to be mapped into a tactile command by the driver by default. The default response is the command that the driver generates in response to that region-shift by default. The preference flag allows the user to override the default mapping by indicating to the driver that the region-shift events and commands for the current area should be obtained from the preferred mapping and preferred response fields, respectively.

The heuristic flag identifies whether the area is identified by mappings or heuristics. The heuristics bit can be set by default when an unknown application is unidentified. As the driver interacts with areas in an application, the heuristics bit can then be reset for those areas as the native procedure derives and stores mappings and responses for the them and in the heuristic mapping and response fields.

An application can also set the heuristics bit. This permits application developers to provide partially-specified preference structure elements for their applications. This can allow for rapid development by permitting a developer to explicitly specify mappings for principal areas of the application while leaving minor modes to be mapped by the driver. The application developer can then either leave the heuristic bit on in the preferences for the application or use the application in the automatic native mode to develop heuristics for the minor areas and save them as defaults in the preferences for the application. The heuristics bit for particular areas may also be set by the user.

The profile data structure can also include user profiles USER1, USER2, . . . USERN for different users. These specify system attributes such as tactile intensity and native status.

Figure 3:
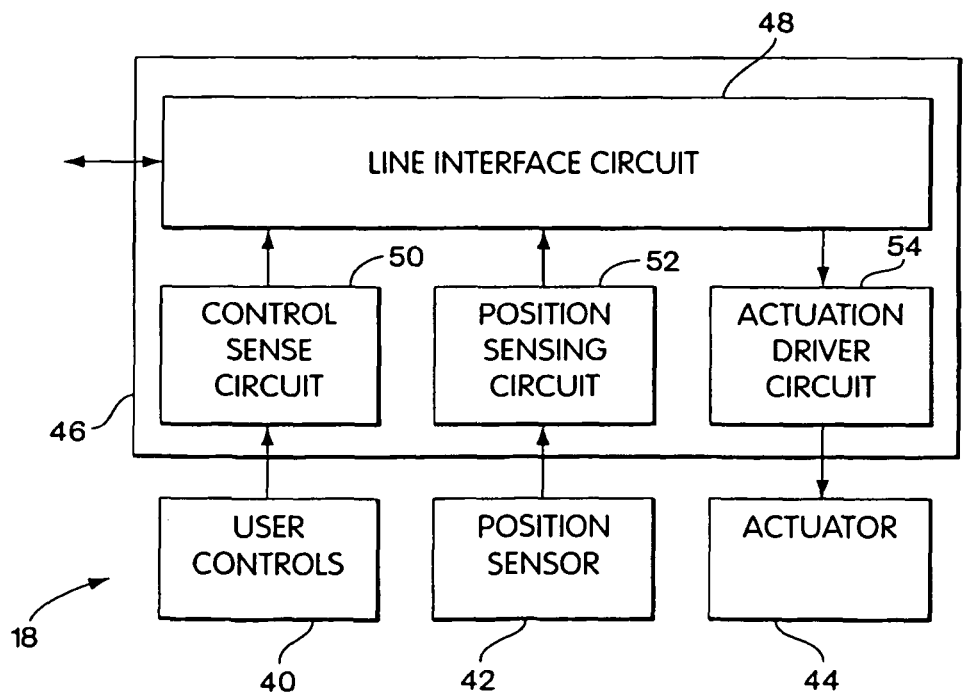
FIG. 3 is a block diagram of a pointing device for the system of FIG. 1.

Referring to FIG. 3, the interactive pointing device 18 includes user controls 40, a position sensor 42, an actuator 44, and an interface circuit 46. The interface circuit includes a control sensing circuit 50 responsive to the user controls, a position sensing circuit 52 responsive to the position sensor, and an actuation driver circuit 54 to which the actuator is responsive. A line interface circuit 48, such as a bi-directional serial line interface, is connected between these circuits and the line leading to the input/output interface 36. These circuits are illustrated as separate circuits, although they may be quite intertwined in practice.

The user controls 40 respond to user actuation to provide user signals to the input/output interface via one of its inputs, and they can include one or more buttons provided on the body of the pointing device. The position sensor 42 can include a two-dimensional opto-electrical sensor or other type of sensor that provides a signal from which the operating system can derive the position of the pointing device. Some kinds of pointing devices, such as digitizing tablets, touch pads, track balls, and joysticks, are not intended to move with respect to a work surface, but derive a position signal in an ergonomically analogous manner.

The actuator 44 is a transducer that receives signals from the processing system via the actuation driver circuit 54, and transduces them into tactile signals that the user can feel with his or her sense of touch where he or she is holding the mouse. The actuator can be a piezo-electric actuator, an electromagnetic actuator (e.g., a solenoid, loudspeaker, or voice coil), or another type of actuator that can provide tactile sensations to the person holding the mouse interface.

The actuator can be, part of the pointing device, or it can be located proximate the pointing device without being part of it. For example, the actuator can be located in a mouse pad 19, which can be used with any mouse, or in a touch pad. The actuator may also produce sound as a by-product of the actuation, or, if desired, the computer system can produce a sound through a speaker that matches or otherwise enhances some or all aspects of the actuation.

The actuator 44 can also produce different types of tactile signals in the mouse. In one approach, the actuator actually displaces the mouse or a portion of the mouse. For example, a solenoid can lift the top of the mouse to achieve this effect. An alternative approach is to provide a pressure wave within or at the surface of the mouse, in such a way that it propagates to the user's hand where it is felt. A piezo-electric actuator located inside the mouse can provide this type of operation. A further approach changes the "feel" of the pointing device. One way to implement this type of approach is to provide a coil around the metal ball of the mouse, such that the presence of the signal impedes the motion of the ball. In different embodiments, changes in any attribute sensed by touch can be modulated, such as moment of inertia, vibrations, heat/cold, electrical impulses, size, or texture. Supplemental mechanical elements may also be used with the transducers to achieve desired tactile effects.

Referring to FIG. 7, in one embodiment, a mouse 100 includes a housing 102 that holds a ball 104 and switches 106. The mouse also includes an interface circuit 110 and an actuator 112, which can be connected to the interface circuit via a connector 114. The actuator is a piezo-electric actuator mounted inside the housing close to its top surface. Such actuators are quite inexpensive, and can be driven with a relatively small amount of energy. The circuit and the actuator can draw power from the computer (e.g., by drawing current from an RS-232 interface) or from another source (e.g., a battery or transformer). As is conventional, the mouse also includes a position-detector and circuitry 108. Other types of mice also exist, such as optical mice, and these may be substituted for the mouse shown in FIG. 7.

Figure 8A:
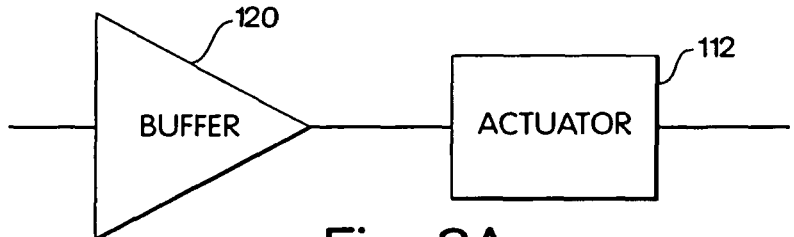
FIG. 8A is a block diagram of a first actuator interface circuit for the mouse of FIG. 7.
Figure 8B:
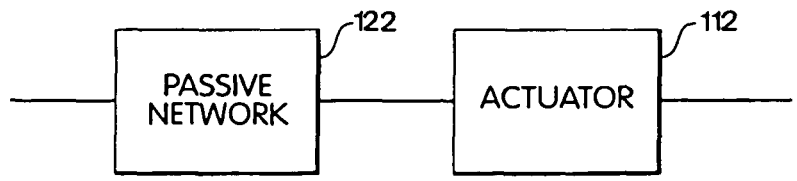
FIG. 8B is a block diagram of a second actuator interface circuit for the mouse of FIG. 7.
Figure 8C:
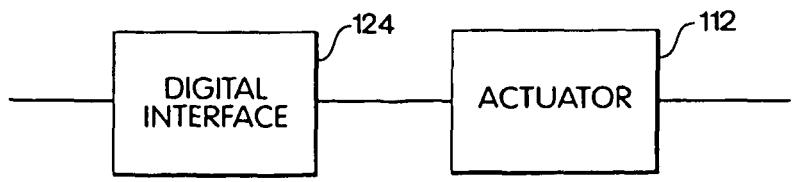
FIG. 8C is a block diagram of a third actuator interface circuit for the mouse of FIG. 7.
Figure 11:
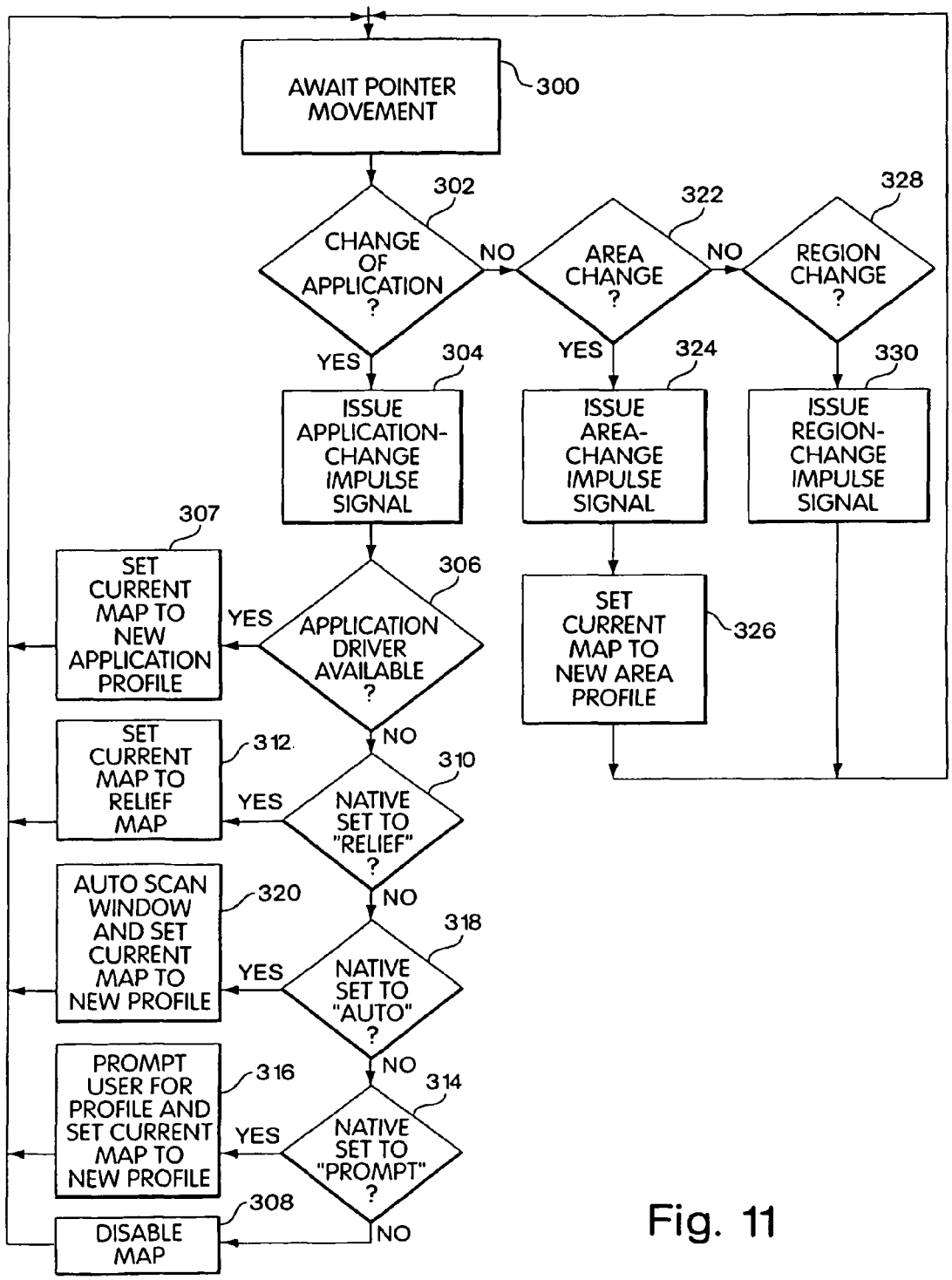
FIG. 11 is a flowchart illustrating operation of the system of FIG. 1.

Referring to FIGS. 8A-8C, the interface circuit 110 includes an actuation driver circuit that drives the actuator 112. The actuation driver circuit can include a buffer circuit 120, a passive network 122, or a digital interface 124. Actuation circuits that employ a buffer amplifier operate by driving the actuator 144 with a version of the signal sent to the mouse. Actuation circuits that include a passive network 122 also drive the actuator with a version of the signal sent to the mouse. In either case, the signal may be relatively faithful to the original, or it may be filtered. The filtering may be provided to enhance the feel of the device, to optimize power transfer into the actuator, or to improve power consumption. The exact design of the filtering characteristic is a function of the properties of the actuator and the desired power and tactile characteristics.

Directly driving the actuator with serial signals simplifies the interface circuitry a serial mouse. Each time an impulse is desired, one character, or a burst of characters, can be sent to the mouse. The signal amplitude of these characters can then be filtered to obtain an analog pulse with which to drive the actuator, and the size and shape of the analog pulse will define the tactile impulse generated by the actuator. By changing the number or makeup of the pulses, the pulse shape can be adjusted in length or magnitude. Character modes are more appropriate for low serial rates, while burst modes are more appropriate for high serial rates.

Referring to FIG. 9, in character mode, a normally-high signal 200 received by the mouse over the serial line can include a character 204 that is made up of all one bits (high), except for its start bit 205. This character can be low-pass filtered by the interface circuitry to generate a smoothed pulse 206, which is used to drive the actuator. If a zero is provided as the most significant bit in another character 208, the serial line will remain low longer, and the resulting actuator driving pulse 210 will also be longer. The user will feel this pulse to be more pronounced. It is also possible to send a character 216 that contains non-consecutive ones 214, 216, to produce a pulse 218 that is shaped differently, and which is therefore more suited to driving the actuator, feels better, or results in better power consumption performance.

Referring to FIG. 10, in burst mode, the mouse operates in a very similar way, except that bursts 224 of whole characters are sent in the serial signal 220 to define a single pulse 226 in the actuator signal. A shorter burst 228 will result in a shorter pulse 230, and a burst 232 made up of different characters can be used to tailor the shape of resulting pulses 234. In systems where a break function is available under appropriate software control, the system can assert the break function instead of sending characters.

A digital interface is more versatile. It can allow pulse shapes of arbitrary dimensions to be generated in response to character-based commands. The interface can include a processor, a wave table, or other digital circuitry designed to convert a character or character sequence into a pulse or pulse train. In one encoding method, the first three bits of an eight-bit command determine the amplitude of a pulse, the next two determine its shape, and the last three determine its length.

The various structures disclosed can include of hardware, software, or a combination of the two, and various economic and technical factors will influence the decision to implement any particular functionality in a particular way.

In operation, referring to FIGS. 4 and 12, the computer system 10 operates in conformance with the operating system 32 and application programs 34, which present display screens 60 that can include one or more display windows 62, 64 to the user. These generally include visual information in the form of text 66 and/or images 68, and usually include regions that are responsive to actuation by dragging, clicking or double-clicking of the pointing device. Some of these regions are delimited areas that act as controls, such as buttons 70, sliders 72, and menu bars 74. Other regions are responsive to actuation by 1) permitting selection by dragging on portions of the region, such as text screens or drawing windows, 2) positioning an insertion point, such as a cursor in a word processor, 3) defining the position of an object, such as a line, shape or picture in a drafting program. Of course, a variety of other modes of responsiveness to the pointing device are possible.

The pointing device driver generally waits in an idle state (step 300) until it detects a movement signal from the pointing device, at which time the pointing interface obtains updated coordinates for the pointing device. The detection can take place as a call to the device driver by a hardware interrupt routine tied to pointer activity, with the coordinates being read from a hardware register or from a lower-level device driver. This detection can include a call-back operation between the driver and operating system. Alternatively, it is possible to poll the coordinate register to detect movement.

The pointing device driver then determines whether the cursor has moved into a portion of the display area maintained by another application (step 302). This can be done by interrogating the operating system, or by interrogating a separate application region map maintained by the driver. If the cursor has changed applications, the device driver sends a window change signal to the pointing device (step 304). The type of command sent is defined by the preferences data structure.

The device driver then determines if a profile is available for the new application (step 306), and sets the current mapping to employ this profile (step 307). If a profile is not available, the driver determines the native status. If the native status is set to "off" in the current user preferences, the driver sends no tactile signals to the pointing device while the cursor is in this window (step 308).

If the native bit is set to "relief" (step 310), the device driver treats the entire window, including any controls or text, as a graphical window (step 312). If the native bit is set to "prompt" (step 314), the driver prompts the user to define an application profile using the preferences window 90 (step 316).

If the native bit is set to "automatic" (step 318), the device driver scans the window to determine its features and defines profile fields that map these features to tactile commands (step 320). This mapping can be accomplished by interrogating the operating system, if operating system functions are used to display elements in the window, or it can employ heuristics to map a window without such information.

The application of heuristics can include searching for text or graphics by applying tests to the information displayed on the screen. Examples of heurisitics can include applying simplified statistical functions to the displayed bit map, looking for large numbers of colors or large regions to detect graphics, or looking for continuous outlines to find controls or sub-windows. One simple set of heuristics includes first searching for text using statistical functions, separating those regions, testing small regions for buttons, testing the top of the window for menus, and mapping the remaining parts of the application window to graphics. This profile is saved on-the-fly, allowing the user to modify it later. The automatic mode can also be invoked from the preferences window 90.

If there was no change in application, the driver determines whether the cursor has changed areas within an application (step 322). If so, the profile settings for that area take effect (step 326). This transition may or may not involve the driver sending an area-change signal to the actuator (step 324).

If there was no change in area, the driver determines whether the cursor has changed regions within an area (step 328). If it has, the driver can send the appropriate signal to the actuator in the pointing device for the type of region change detected, based on the preferences for the area (step 330).

The profiles define a map for the display of each of the windows. This map allows the pointing device driver to determine what tactile attributes correspond to a mouse position. The map may be a bit-map, a character map, a formula, or any other representation that the pointing device driver can access to determine tactile attributes of the positions of the cursor. These maps need not correspond exactly to the display, nor do they need to correspond to a map that is easily displayed itself. All that is needed is a construct that the pointing device driver can interrogate.

One frequently-used type of map is a pixel-correspondence map. Such a map can be used for graphical applications, such as drawing programs, photographic manipulation programs, or geographic map applications. When a pixel-correspondence map is used, each pixel can take on a tactile characteristic. When a user moves the cursor between pixels having different tactile attributes within a pixel-correspondence-mapped display, the pointing device provides feedback to the user. For example, a difference in display intensity of adjacent pixels can be mapped to an impulse to be sent to the pointing device. The physical amplitude and/or shape of the impulse can correspond to the change in different ways. For example, they can be fixed, they can correspond to the difference in display intensity of the pixels, pointer direction or velocity, or specific changes can be mapped to specific commands.

When the cursor passes onto a differently-mapped area of the screen, such as another application window or area, or when the screen is remapped, the interface will respond differently. For example, in another frequently-used type of interface, tactile commands are mapped on a character-by-character basis. Such a map is called a character-correspondence map.

Character-correspondence maps can generate tactile commands when a user moves from one character to the next. The tactile command intensities and shapes can be fixed, or they can be mapped to text attributes, such a bold, font, or underline attributes. This mapping can be more meaningful than pixel mapping in word processing or other text-based applications. Character-based mapping can generate signals when a cursor passes from the boundary of one character to character to the boundary of another, such as when the cursor moves between the characters.

Of course, other types of mapping can exist. Tactile commands can be mapped to other visible transitions, such as icon, glyph, color, or pattern boundaries, or they can be mapped to transitions between invisible regions that have some other meaning (e.g., impulse intensity might be mapped to an invisible depth dimension.) These mappings can be fixed, fixed with user adjustments, or completely user-specified. Control areas, such menu bars and buttons, can also have maps. Such areas can use distinctive tactile sensations, such as double-impulses or higher-amplitude impulses to distinguish them from text or graphics areas.

Tactile feedback can also have an anticipatory attribute. This may compensate for lags in the software or actuator, or simply "feel better." For example, when a user moves his or her pointing device quickly, it is possible for the driver to anticipate changes in tactile attributes and trigger them early. The amount by which a command is moved up can correspond to mouse speed, and anticipatory attributes need not be turned on until the mouse reaches a particular speed.

The driver can also simplify the tactile signal sent to the user when the pointing device moves quickly. This can be accomplished by decimating or low-pass filtering an anticipated or actual signal for a particular actual or anticipated path. In one mode, tactile feedback is eliminated at high speeds and reestablished at lower speeds. This provides tactile feedback for small-scale tasks that require fine or detailed cursor control, such as finding a pixel in a drawing program, but does not supply large numbers of tactile signals to the user while he or she is sweeping from one program to another. Although speed is a simple indicator for varying feedback characteristics, characteristics of the speed may also be important. For example, deceleration can be an important cue to reestablishing tactile feedback. Such speed profiles can vary from user to user, and it may be beneficial to provide user adjustments for them, or for the pointer driver to automatically adjust to different individuals' movement patterns.

The driver can also normalize signal intensity. By scanning the minimum and maximum tactile characteristics, such as pixel intensity, in a screen, and matching these to preset maximum and minimum tactile intensity preference levels, the system can provide more comfortable tactile feedback. A screen with low contrast will therefore provide similar amounts of tactile information to a screen with high contrast.

It is also possible to provide guard bands (hysteresis) at region boundaries to prevent chattering when the cursor sits close to the edge of a region. These guard bands can be implemented by requiring that a displacement exceed a predetermined threshold, such as by moving two or more pixels before tactile signals are sent when the cursor is moved.

The system can also change display attributes of the cursor displayed on the screen, such as the color of the cursor, when the position sensor indicates a change in position or when a tactile mode changes. This can enhance the user's ability to find the cursor when the pointing device is moved. In addition, the system can include a tactility control on the pointing device and send different tactile signals to the actuator in response to user actuation of the control. For example, an extra mouse button can enable, disable, or adjust the intensity of tactile signals.

Note that the flowchart of FIG. 10 assumes a high update resolution (i.e., cursor movements are detected for all pixels, at least at some mouse movement rates). If lower sampling rates cause updating to occur less frequently, the relationship between determinations may need to be different. For example, it may be necessary to check for combinations of types of changes and issue multiple signals in a single branch.

While the illustrative embodiment described above is organized around a modular design, it is also possible to assemble embodiments that employ a different breakdown of the functional and structures involved, while still obtaining benefits from the invention.

What is claimed is:

1. An apparatus including a pointing interface, comprising:
a housing having a portion for a user to touch,
a position detector responsive to a position of a user's touch,
an output interface responsive to the position detector for providing position information about touch events at the position detector to a computer running a general-purpose operating system,
a display responsive to the operating system to display areas of both graphical and textual information, wherein positions on the display correspond to positions on the position detector and digital events on the display correspond to touch events on the position detector,
a plurality of applications of different kinds running on the computer and operative to interact with the operating system to display at least some of the areas of graphical and textual information and to respond to the digital events,
a configuration interface operative to define different associations between the digital events corresponding to the position information and tactile signals of differing types each corresponding to different particular applications interacting with the particular digital events,
an input interface for receiving from the computer, in response to digital events corresponding to touch events at the position detector, the tactile signals of the particular different type that each correspond to the particular application interacting with a particular digital event in the computer, and
an actuator that is fully mounted at one or more mounting locations that are in fixed relation to the housing portion and is responsive to the input interface, wherein the actuator is responsive to each of the particular tactile signals to produce and convey a particular tactile pressure wave to the user through the mounting locations to the portion of the housing for the user to touch.

2. The apparatus of claim 1 wherein the input is a serial input line and wherein the actuator is responsive to individual characters sent on the input line.

3. The apparatus of claim 1 wherein the input is a serial input line and wherein the actuator is a responsive to bursts of characters sent on the input line.

4. The apparatus of claim 1 wherein the actuator is a piezoelectric actuator.

5. The apparatus of claim 1 wherein the pointing device is a touch pad.

6. The apparatus of claim 1 further including an actuation driver circuit between the input and the actuator.

7. The apparatus of claim 6 wherein the actuation driver circuit includes a buffer amplifier.

8. The apparatus of claim 6 wherein the actuation driver circuit includes a passive network amplifier.

9. The apparatus of claim 6 wherein the actuation driver circuit includes a digital interface.

10. The apparatus of claim 6 wherein the actuation driver circuit includes a filter.

11. A method of providing tactile feedback to a user, comprising:
detecting a first position touched by a user on a touch surface,
transmitting a first signal of a first type corresponding to the first detected position,
detecting a first digital event of a first type caused by the first signal by a first application running on a computer running a general-purpose operating system and operative to display areas of both graphical and textual information on a display,
updating the display based on signals transmitted from the touch surface,
associating the first digital event with a first tactile signal of a first type,
receiving the first tactile signal of the first type corresponding to the first position for which a signal corresponding to the first detected position has been transmitted,
conveying for the first tactile signal received a tactile pressure wave to the user through the touch surface,
temporarily refraining from conveying further tactile signals,
detecting a second position touched by a user on the touch surface after the step of refraining,
transmitting a second signal of the first type corresponding to the second detected position,
detecting a second digital event of the first type caused by the second signal by a second application running on the computer running a general-purpose operating system and operative to display areas of both graphical and textual information on the display,
associating the second digital event of the first type, detected by the second application, with a second tactile signal of a second type,
receiving the second tactile signal of the second type corresponding to the second position for which a signal corresponding to the second detected position has been transmitted, and
conveying for the second tactile signal received a tactile pressure wave to the user through the touch surface.

12. The method of claim 11 wherein the steps of receiving tactile signals receive characters.

13. The method of claim 11 wherein the steps of conveying are performed by a piezoelectric actuator.

14. The method of claim 11 wherein the steps of detecting, transmitting, receiving, and conveying are performed for a touch pad.

15. The method of claim 11 further including the step of filtering the received tactile signals.

16. The apparatus of claim 1 wherein the actuator is responsive to each of the tactile signals to convey a single-pulse tactile pressure wave to the user through the housing.

17. The apparatus of claim 1 wherein the actuator is responsive to each of the tactile signals to convey a multi-pulse tactile pressure wave to the user through the housing.

18. The apparatus of claim 1 wherein the input and the output are serial lines that are operative to convey signals to a computer held in a separate housing from the pointing device housing.

19. The method of claim 11 wherein the steps of conveying convey single-pulse tactile pressure waves to the user through the housing.

20. The method of claim 11 wherein the steps of conveying convey multi-pulse tactile pressure waves to the user through the housing.

21. The apparatus of claim 1 further including a separately housed keyboard.

* * * * *